UNITED STATES PATENT OFFICE.

HENRY W. JOSLIN, OF TRENTON, NEW JERSEY.

IMPROVEMENT IN TREATMENT OF INDIA-RUBBER.

Specification forming part of Letters Patent No. 22,560, dated January 11, 1859.

*To all whom it may concern:*

Be it known that I, HENRY W. JOSLIN, of the city of Trenton, in the State of New Jersey, have invented a new combination of matter, being a new and improved mode of modifying the ordinary natural properties of india-rubber or caoutchouc, so as to increase the value of this substance, by which it is rendered less liable to be injured by heat, cold, and various destructive agents than india-rubber or caoutchouc in its ordinary state, or, in technical language, "vulcanizing" it; and I do hereby declare that the following is a full and exact description of said invention.

The nature of my invention consists in the combining sulphuret of zinc, either artificial or native, with india-rubber or caoutchouc, and submitting the compound thus formed to the action of heat, by which in its nature and qualities it becomes so altered as not to be affected by heat unless of a higher temperature than that used in its preparation, nor will it be injured by cold or its useful qualities impaired.

The material or article which I use in combination with india-rubber or caoutchouc in forming my new and improved combination of matter is sulphuret of zinc, either artificial or native, which material may be employed in combination with india-rubber or caoutchouc in different proportions.

The proportion I have found to produce the best result in forming the new combination of matter aforesaid is one part of india-rubber or caoutchouc incorporated with one part of sulphuret of zinc, either artificial or native.

The mode of effecting the combination of the materials is as follows: I pass the india-rubber or caoutchouc, together with the sulphuret of zinc in the above proportions, through or between the calender rollers or grinders now used in preparing or manufacturing india-rubber or caoutchouc for use, which rollers should be heated to a temperature of from 80° to 100°. After thoroughly passing the said mixture through the rollers, by which means the materials become thoroughly combined, I then put the product into such form and shape as I desire to make use of it. For example, I spread it upon cloth or put it in such other form as is known to manufacturers of india-rubber or caoutchouc goods or others, and I then subject it to a high degree of heat by means of steam, hot air, or otherwise, and said temperature may vary from 300° to 500° Fahrenheit.

The process of preparing my sulphuret of metallic zinc is as follows: I take forty (40) pounds of oxide of zinc to sixteen (16) pounds of flour of sulphur, or in these proportions. I then mix them together and place the mixture in a crucible, and submit this mixture to heat at a temperature of low redness until the excess of sulphur and oxygen has passed off in vapor and leaves a perfect sulphuret of metallic zinc, or sulphur chemically combined with zinc, and entirely free from raw sulphur.

Having thus fully described the nature of the process by which I prepare my new combination of matter, I do hereby disclaim the use of oxide of zinc or sulphur, either separately or mixed, as heretofore used, and I also disclaim the use of hydrated sulphide of zinc or any other similar sulphide that is prepared by a solution of an alkali.

As a new and useful compound for curing or vulcanizing india-rubber it is superior to all other known processes. It has none of the offensiveness of goods cured with sulphur. It is much finer in texture. It retains all of its original strength and elasticity and is more adaptable to the arts. It is much cheaper to manufacture, as I dispense with all such processes as boiling in alkali either the compound in preparation or the cured goods, thereby saving time, labor, and money. It will stand a much higher temperature and will be less affected by cold than rubber cured by any other mode known, thereby making it a more useful article, as it will not be affected by heat that would entirely destroy that prepared by any of the other known modes.

Having thus clearly described my improved process for curing or vulcanizing india-rubber, I will state what I claim and desire to secure by Letters Patent—

The use and employment of sulphuret of zinc, either artificial or native, substantially prepared by the aforesaid process above described, in combination with india-rubber, for the purpose of curing or vulcanizing it in form and manner as herein set forth, without the use of free sulphur in any way in combination with the rubber.

HENRY W. JOSLIN.

Witnesses:
CHAS. HAYST,
WM. SANDERS.